United States Patent
Maeda et al.

(10) Patent No.: US 9,575,402 B2
(45) Date of Patent: Feb. 21, 2017

(54) ILLUMINATION OPTICAL SYSTEM WITH LIGHT-COMPRESSING LENS ARRAYS HAVING NO OPTICAL POWER ON ONE SECTION AND IMAGE PROJECTION APPARATUS HAVING THE SAME

(75) Inventors: Yuuki Maeda, Utsunomiya (JP); Takashi Sudo, Utsunomiya (JP); Hiroyuki Kodama, Utsunomiya (JP); Yu Yamauchi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 347 days.

(21) Appl. No.: 13/334,744

(22) Filed: Dec. 22, 2011

(65) Prior Publication Data
US 2012/0162610 A1 Jun. 28, 2012

(30) Foreign Application Priority Data
Dec. 27, 2010 (JP) .................................. 2010-290485

(51) Int. Cl.
*G03B 21/20* (2006.01)
*H04N 9/31* (2006.01)
(Continued)

(52) U.S. Cl.
CPC ......... *G03B 21/208* (2013.01); *G02B 27/0961* (2013.01); *H04N 9/3129* (2013.01);
(Continued)

(58) Field of Classification Search
CPC .. H04N 9/3167; H04N 9/3197; H04N 9/3152; G02B 27/0961; G02B 27/283; G03B 21/208
(Continued)

(56) References Cited

U.S. PATENT DOCUMENTS 6,464,362 B1 * 10/2002 Sugawara et al. ............ 353/102
6,839,095 B2 * 1/2005 Bierhuizen et al. ............ 349/9
(Continued)

FOREIGN PATENT DOCUMENTS

| CN | 1464995 A | 12/2003 |
|---|---|---|
| CN | 1553246 A | 12/2004 |

(Continued)

OTHER PUBLICATIONS

Notification of the First Office Action for corresponding CN 201110441995.1, mail date Feb. 17, 2014. English translation provided.

(Continued)

*Primary Examiner* — Bao-Luan Le
(74) *Attorney, Agent, or Firm* — Rossi, Kimms & McDowell LLP

(57) ABSTRACT

An illumination optical system includes a first compression system configured to compress a light flux on each of first and second sections, a second compression system configured to compress the light flux on the first section, a polarization converter arranged so that a section that contains a normal of the second polarization splitting surface and the optical axis becomes the second section, and configured to convert non-polarized light into linearly polarized light, a first lens array arranged in front of the polarization converter along an optical path, and a second lens array arranged between the first lens array and the polarization converter along the optical path. Both of the first lens array and the second lens array have no optical power on the second section.

11 Claims, 4 Drawing Sheets

(51) Int. Cl.
*G02B 27/09* (2006.01)
*G02B 27/28* (2006.01)

(52) U.S. Cl.
CPC ......... *H04N 9/3152* (2013.01); *H04N 9/3167* (2013.01); *G02B 27/283* (2013.01)

(58) Field of Classification Search
USPC .......................................................... 353/38
See application file for complete search history.

(56) References Cited

U.S. PATENT DOCUMENTS

| | | | |
|---|---|---|---|
| 6,866,404 B2* | 3/2005 | Yamauchi et al. | 362/299 |
| 7,198,376 B2 | 4/2007 | Katsumata et al. | |
| 7,575,328 B2* | 8/2009 | Inoko | 353/38 |
| 7,686,459 B2* | 3/2010 | Inoko et al. | 353/102 |
| 7,690,793 B2* | 4/2010 | Kodama et al. | 353/20 |
| 7,935,920 B2 | 5/2011 | Yamauchi et al. | |
| 2003/0214617 A1* | 11/2003 | Bierhuizen et al. | 349/113 |
| 2005/0024591 A1* | 2/2005 | Lian et al. | 353/20 |
| 2005/0128435 A1* | 6/2005 | Yamauchi et al. | 353/20 |
| 2006/0290903 A1* | 12/2006 | Inoko et al. | 353/102 |
| 2007/0291344 A1* | 12/2007 | Yamauchi et al. | 359/205 |
| 2009/0002634 A1* | 1/2009 | Kadowaki et al. | 353/20 |
| 2009/0284838 A1* | 11/2009 | Sudo | 359/622 |

FOREIGN PATENT DOCUMENTS

| | | |
|---|---|---|
| CN | 1648764 A | 8/2005 |
| CN | 101086557 A | 12/2007 |
| JP | 07-181392 A | 7/1995 |
| JP | 2000137204 A | 5/2000 |
| JP | 2002-040416 A | 2/2002 |
| JP | 2003-075916 A | 3/2003 |
| JP | 2007-003744 A | 1/2007 |
| JP | 2007-078951 A | 3/2007 |
| JP | 2008-299298 A | 12/2008 |
| JP | 4273642 B2 | 6/2009 |
| JP | 2009-288407 A | 12/2009 |

OTHER PUBLICATIONS

Notification of the Second Office Action issued in corresponding Chinese Patent Application No. 201110441995.1, dated Oct. 24, 2014. English translation provided.

Office Action dated Aug. 19, 2014, issued in Counterpart Japanese Patent Application No. 2010-290485.

Office Action issued in Chinese Appln. No. 201510353154.3 mailed May 4, 2016. English translation provided.

* cited by examiner

ILLUMINATION OPTICAL SYSTEM WITH LIGHT-COMPRESSING LENS ARRAYS HAVING NO OPTICAL POWER ON ONE SECTION AND IMAGE PROJECTION APPARATUS HAVING THE SAME

BACKGROUND OF THE INVENTION

Field of the Invention

The present invention relates to an illumination optical system and an image projection apparatus, such as a liquid crystal projector.

Description of the Related Art

Japanese Patent Laid-Open No. ("JP") 2008-299298 proposes changing of a compression ratio of a light flux between a longitudinal section and a lateral section in an illumination optical system for a liquid crystal projector where the longitudinal section is a plane that contains a normal of a polarization splitting surface and the lateral section is a section that contains the optical axis and is orthogonal to the longitudinal section. The compression of the light flux on the longitudinal section is effective in narrowing an incident angle distribution of a light flux upon the PBS and to maintain the contrast. The compression of the light flux on the lateral section is effective in a miniaturization of the illumination optical system.

JP 7-181392 provides a first integrator having a positive power and a second integrator having a negative power on the lateral section. JP 2002-40416 compresses a light flux using a cylindrical lens rather than an integrator on the longitudinal section, and does not compress the light flux on the lateral section.

However, JPs 7-181392 and 2002-40416 are disadvantageous because they compress the light flux only in a single direction, that is, either on the longitudinal direction or on the lateral direction, and the illumination optical system (or the liquid crystal projector) becomes longer.

In addition, the illumination optical system disclosed in JP 2008-299298 secures the power of the first integrator on the lateral section by changing (or decentering) a height of a vertex of each lens cell of the first integrator. Therefore, a distance between each lens cell and the polarization converter does not become constant, and a sufficiently bright image cannot be provided.

SUMMARY OF THE INVENTION

The present invention provides a small image projection apparatus that can project a bright image.

An illumination optical system according to the present invention is configured to illuminate an image display device using a light flux from a light source. The illumination optical system includes a polarization splitter having a first polarization splitting surface configured to split a polarization component of the light flux, a first compression system configured to compress the light flux on each of a first section that contains a normal of the first polarization splitting surface and an optical axis of the illumination optical system, and a second section that contains the optical axis and is orthogonal to the first section, a second compression system configured to compress the light flux on the first section, a polarization converter that includes a second polarization splitting surface, is arranged so that a section that contains a normal of the second polarization splitting surface and the optical axis becomes the second section, and is configured to convert non-polarized light into linearly polarized light, a first lens array that includes a plurality of lens cells configured to split the light flux into a plurality of light fluxes, and is arranged in front of the polarization converter along an optical path, and a second lens array that includes a plurality of lens cells corresponding to the plurality of lens cell of the first lens array, and is arranged between the first lens array and the polarization converter along the optical path. Both of the first lens array and the second lens array have no optical power on the second section.

Further features of the present invention will become apparent from the following description of exemplary embodiments with reference to the attached drawings.

DESCRIPTION OF THE EMBODIMENTS

A description will be given of embodiments of the present invention with reference to the accompanying drawings.

First Embodiment

Figure 1:
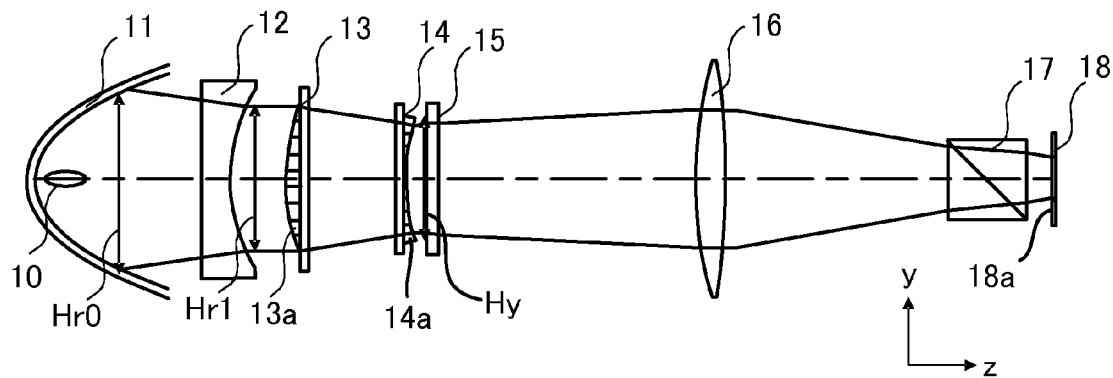
FIG. 1 is a longitudinal sectional view of an illumination optical system according to a first embodiment.
Figure 2:
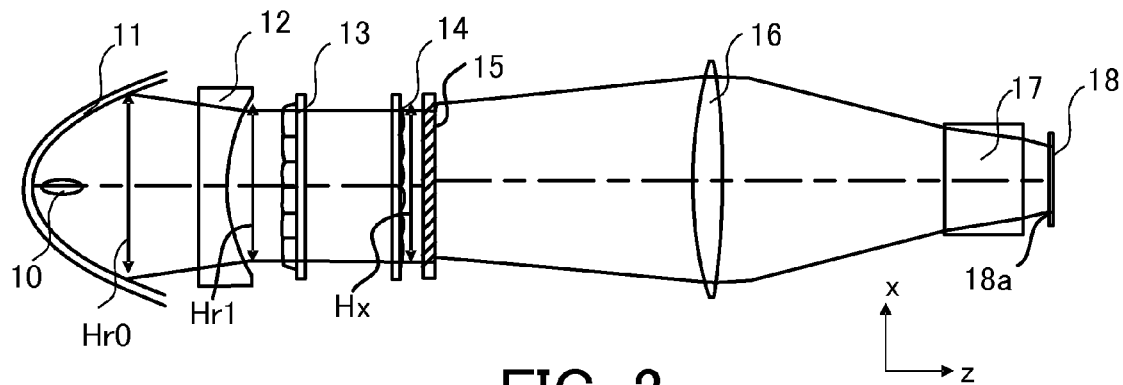
FIG. 2 is a lateral sectional view of the illumination optical system illustrated in FIG. 1 according to the first embodiment.

FIGS. 1 and 2 are optical path diagrams illustrating an illumination optical system configured to illuminate a reflection type liquid crystal panel of a liquid crystal projector (image projection apparatus) according to a first embodiment. FIG. 1 illustrates a longitudinal section, and FIG. 2 illustrates a lateral section. This embodiment set a longitudinal section to a plane that contains a normal of a polarization splitting section of a polarization beam splitter ("PBS") and the optical axis, and a lateral section to a section that contains the optical axis and is orthogonal to the longitudinal section. The longitudinal section is set to the YZ plane (first section) and the lateral section is set to the XZ plane (second section).

The illumination optical system illuminates the reflection type liquid crystal panel (simply referred to as a "liquid crystal panel" hereinafter) as an image display device via a PBS 17 utilizing a light flux from a light source 10. The image light modulated by the liquid crystal panel 18 is guided to a projection lens (not illustrated) via the PBS 17 again and projected onto a projected surface, such as a screen.

This embodiment sets an optical axis of the illumination optical system (which is defined, for example, as an axial line that passes the center of a condenser lens 16 and a panel surface center of the liquid crystal panel 18) to the Z axis and the optical axis direction to the direction parallel to the Z axis. A direction along the Z axis in which the light flux from the light source 10 travels from the condenser lens 16 to the liquid crystal panel 18 and the PBS 17 is a traveling direction of the light, and the optical path is formed in this direction.

Figure 3:
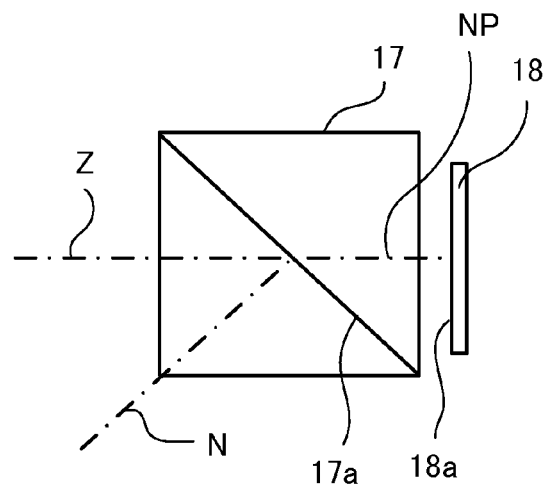
FIG. 3 is a longitudinal sectional view of a polarization beam splitter illustrated in FIG. 1 according to the first embodiment.

The longitudinal section (YZ plane) is a section having a smaller angular distribution of the light flux incident upon the panel surface 18a (entry/exit surface) of the liquid crystal panel 18, and is a section parallel to an extending direction of a short side of the liquid crystal panel 18. The longitudinal section is a section parallel to a surface (or a paper plane of FIG. 3) that contains the optical axis (Z axis) and the normal (N) of the polarization splitting surface 17a of the PBS 17. The longitudinal section is a section parallel to the normal N of the polarization splitting surface 17a and a normal NP of the panel surface 18a of the liquid crystal panel 18.

The lateral section (XZ plane) is a section having a larger angle distribution of the light flux incident upon the panel surface 18a of the liquid crystal panel 18, and is a section parallel to the extending direction of a long side of the liquid crystal panel 18. The lateral section contains the optical axis and is orthogonal to the longitudinal section.

The light flux emitted in a radial shape from the light source 10, such as a high-pressure mercury discharge tube, is converted into a convergent light flux by an elliptic reflector (first optical element) 11. Since the elliptical reflector can reduce the number of lenses, the reflector becomes smaller.

The reflected light reflected by the elliptical reflector 11 is collimated by a collimator lens (second optical element) 12. The elliptical reflector 11 and the collimator lens 12 constitute an afocal system, or a first compression system configured to compress the light flux from the light source 10. The first compression system compresses a light flux both on the longitudinal section and on the lateral section.

The light flux collimated by the first compression system is split into a plurality of light fluxes by the first fly-eye lenses 13, and the plurality of split light fluxes form a plurality of secondary light source images near the second fly-eye lens 14 and the polarization converter 15. The light flux that forms each secondary light source image is converted into linearly polarized light having a predetermined polarization direction by the polarization converter 15, and then enters the condenser lens 16.

The first fly-eye lens 13 includes a plurality of lens cells 13a configured to split the incident light flux into a plurality of light flux, and is arranged in front of the polarization converter 15 along the optical path. The second fly-eye lens 14 includes a plurality of lens cells 14a, and is arranged between the first fly-eye lens 13 and the polarization converter 15 along the optical path.

Figure 4:
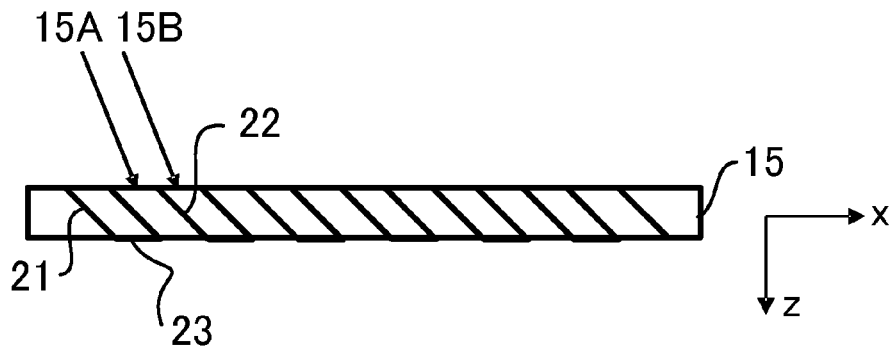
FIG. 4 is a lateral sectional view of a polarization converter illustrated in FIG. 1 according to the first embodiment.

FIG. 4 is a lateral sectional view of the polarization converter 15. The polarization converter includes a plurality of polarization splitting surfaces (second polarization splitting surfaces) 21, a plurality of reflective surfaces 22, and a plurality of half-plates 23. A polarization component orthogonal to a predetermined polarization direction among light incident upon the polarization splitting surface 21 transmits through the polarization splitting surface 21, and its polarization direction is converted by 90° by the half-plate 23 and exits from the polarization converter 15. On the other hand, a polarization component parallel to the predetermined polarization direction among the light incident upon each polarization splitting surface 21 is reflected by the polarization splitting surface 21, then reflected by the reflective surface 22, and exited. As a result, the polarization converter 15 converts incident non-polarized light into linearly polarized light having a predetermined polarization direction, and emits the resultant light.

The polarization converter 15 alternately includes two types of areas as an effective area 15A and a non-effective area 15B on the XZ section, and light entering the effective area 15A becomes predetermined polarized light suitable for effective utilizations. As illustrated in FIG. 4, the polarization converter 15 is arranged so that a section parallel to a plane that contains the optical axis and the normal of the polarization splitting surface 21 (or a paper plane of FIG. 4) can become the lateral section (XZ section).

A plurality of split light fluxes emitted from the condenser lens 16 are superimposed on the liquid crystal panel 18 through the polarization splitting surface 17a of the PBS 17. Thereby, the liquid crystal panel 18 is illuminated by uniformly distributed illumination light fluxes.

The image light modulated and reflected by the liquid crystal panel 18 is reflected by the polarization splitting surface 17a of the PBS 17 and guided to the projection lens (not illustrated). While this embodiment illustrates the single liquid crystal panel 18, the actual and general projector includes three liquid crystal panels corresponding to RGB. The PBS 17 forms part of a color analyzing/synthesizing optical system configured to guide each RGB colored illumination light corresponding to one of the three liquid crystal panels, and synthesize each colored image light from the three liquid crystal panels.

The PBS 17 includes a (first) polarization splitting surface 17a that is arranged oblique to the optical axis (Z axis) of the illumination optical system and includes a multilayer film (polarization splitting film). The polarization splitting film 17a splits the polarization component of the light flux. A slope of the polarization splitting surface 17a to the optical axis Z is generally set to 45° or between 42° and 48°. The angular dependency of the polarization splitting surface 17a is disclosed in JP 2008-299298.

The polarization splitting surface 17a has a splitting function based upon the polarization direction for the light of at least part of a wavelength region in the visible light region, such as a wavelength region having a width of 100 nm or larger. In general, among light incident at specific angle(s), the polarization splitting surface 17a reflects light in the first polarization direction by 80% or more and transmits light in the second polarization direction orthogonal to the first polarization direction by 80% or more.

Figure 5:
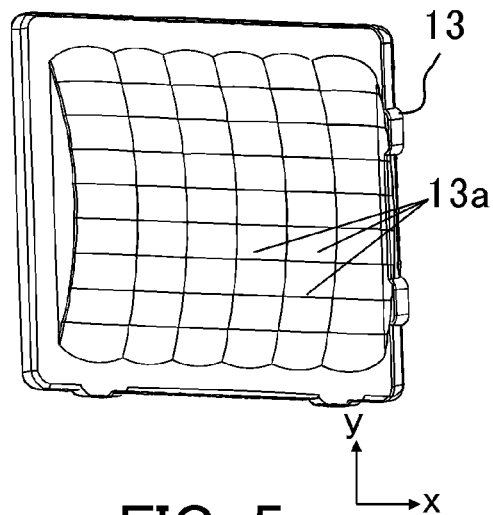
FIG. 5 is a perspective view of a first fly-eye lens illustrated in FIG. 1 according to the first embodiment.
Figure 6:
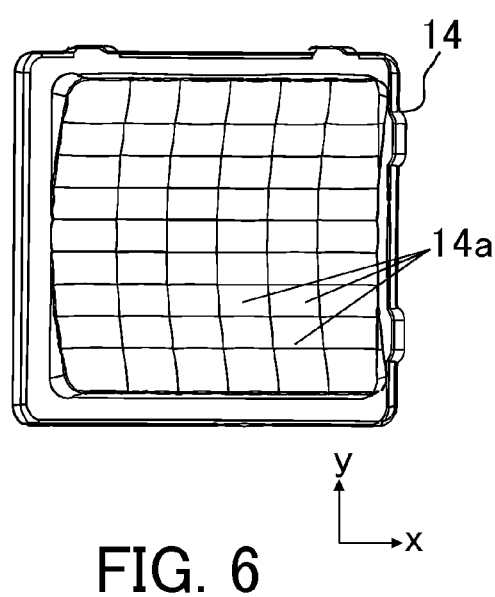
FIG. 6 is a perspective view of a second fly-eye lens illustrated in FIG. 1 according to the first embodiment.

A plurality of lens cells are arranged in the two-dimensional directions in the first and second fly-eye lenses 13, 14. The centerline of each fly-eye lens is parallel to the Z axis. FIG. 5 is a perspective view of the first fly-eye lens 13, and FIG. 6 is a perspective view of the second fly-eye lens 14.

In the longitudinal section illustrated in FIG. 1, the first fly-eye lens 13 wholly serves as a positive (convex) lens, because the vertexes of the lens cells other than the central lens cells in the plurality of lens cells 13a illustrated in FIG. 5 decenter to the inside in the Y direction. In other words, the vertex position (or height) of each lens cell 13a is different in the longitudinal section illustrated in FIG. 1.

In the longitudinal section illustrated in FIG. 1, the second fly-eye lens 14 wholly serves as a negative (concave) lens, because the vertexes of the lens cells other than the central lens cells in the plurality of lens cells 14a illustrated in FIG.

6 decenter to the outside in the Y direction. In other words, in the longitudinal section illustrated in FIG. 1, the vertex position (or height) of each lens cell 14a is different in the longitudinal section illustrated in FIG. 1.

The first fly-eye lens 13 and the second fly-eye lens 14 constitute a second compression system configured to compress the light flux on the longitudinal section. The YZ section (longitudinal section) is more sensitive to the XZ section (lateral section) for changes of the polarization splitting characteristic along with the incident angular changes of the polarization splitting surface of the PBS 17. The first and second compression systems reduce the angular distribution on the longitudinal section, enables light to enter the PBS 17 at a suitable angle, and improve the image quality, such as the less uneven brightness and more enhanced contrast.

Thus, the first compression system compresses the light flux both on the longitudinal section and on the lateral section with a compression amount necessary for the lateral section, and the second compression system compresses the light flux only on the longitudinal section. As a result, this embodiment realizes asymmetrical compressions of the light flux between the longitudinal section and the lateral section.

The compression of the light flux on the longitudinal section is effective in reducing the angular distribution of the light flux incident upon the polarization splitting surface 17a of the PBS 17, and in restraining the contrast drop. The compression of the light flux on the lateral section contributes to the miniaturization. Since a pair of fly-eye lenses have no power on the lateral section (due to the constant vertex position of each lens cell), the distance between each lens cell and the polarization converter 15 becomes constant. In other words, both of the first fly-eye lens 13 (first lens array) and the second fly-eye lens (second lens array) have no optical power on the second section. Since the light source images made near the polarization converter 15 have almost constant positions, a light amount that passes the effective area 15A can be increased so as to secure the brightness. The optical power, as used herein, means an optical power (refractive power) to a ray incident upon the center of each lens cell parallel to the optical axis. Moreover, since a pair of fly-eye lenses has powers on the longitudinal section, the cost becomes lower and the size becomes smaller than using an expensive cylindrical lens.

Since the lens cells of the first fly-eye lens 13 do not decenter on the lateral section, the secondary light source images in the Z direction have almost constant positions. The first fly-eye lens 13 does not have to be decentered on the lateral section because the parallel light enters the first fly-eye lens 13.

This embodiment can relatively inexpensively project a bright image and restrain the image quality degradation.

The following condition may be satisfied where α is a compression ratio on the YZ section between the first and second fly-eye lenses 13 and 14 due to decentering of their lens cells:

$$1.1 < \alpha < 1.9. \qquad \text{Expression 1}$$

When the value is smaller than the lower limit of Expression 1, the image quality degrades, such as the uneven brightness and the contrast drop, and the intended performance becomes unavailable. When the value is larger than the upper limit of Expression 1, the decentering amounts of the lens cells of the first fly-eye lens 13 and the second fly-eye lens 14 become larger and they become thick in the optical axis direction. As a result, an aberrational amount that occurs in the fly-eye lens becomes larger, the image quality degradation and the brightness drop occur, and the intended performance becomes unavailable.

α may further satisfy the following expression:

$$1.1 < \alpha < 1.5. \qquad \text{Expression 2}$$

The compression of the light flux on the lateral section enables effective utilizations of the light flux from the elliptical reflector 11 and thus provides a bright image while maintaining a predetermined size of the optical system. Where β is a compression ratio between the XZ section and the YZ section of the compression system that includes the elliptical reflector 11 and the collimator lens 12, the compression ratio β may satisfy the following expression:

$$1.1 < \beta < 1.9. \qquad \text{Expression 3}$$

When the value is smaller than the lower limit of Expression 3, a light quantity from the elliptical reflector 11 becomes smaller for effective utilizations and thus a bright image and the intended performance are unavailable. When the value is larger than the upper limit, the light from the elliptical reflector 11 can be effectively utilized but a plurality of secondary light source images formed near the second fly-eye lens 14 and the polarization converter 15 becomes larger. As a result, a light amount used to illuminate the panel effective area reduces, and thus a bright image and the intended performance are unavailable.

β may further satisfy the following expression:

$$1.1 < \beta < 1.5. \qquad \text{Expression 4}$$

A description will now be given of α and β with reference to FIGS. 1 and 2. Hr0 denotes a light flux width (in the direction perpendicular to the optical axis) reflected by the elliptical reflector 11. Hr1 denotes a light flux width (in the direction perpendicular to the optical axis) collimated by the collimator lens 12. Hx denotes a light flux width on the XZ section just before the polarization converter 15. Hy denotes a light flux width on the YZ section just before the polarization converter 15.

Herein, α and β can be expressed as follows:

$$\alpha = Hr1/Hy \qquad \text{Expression 5}$$

$$\beta = Hr0/Hr1 \qquad \text{Expression 6}$$

$$Hx = Hr1 \qquad \text{Expression 7}$$

In this embodiment, α=1.26 and β=1.30, satisfying Expressions 1 to 4.

Each lens cell 13a of the first fly-eye lens 13 may be a toric lens and form a secondary light source image on the XZ section on the side of the polarization converter 15 and a secondary light source image on the YZ section of the second fly-eye lens 14.

An improvement of the utilization efficiency of the polarization converter 15 depends upon the position of the secondary light source image on the XZ section rather than the position of the secondary light source image on the YZ section. Hence, the utilization efficiency of the fly-eye lens is improved by creating the secondary light source image on the second fly-eye lens 14 on the longitudinal section.

This is because light that passes part other than the corresponding lens cells of the first fly-eye lens 13 and the second fly-eye lens 14 becomes unnecessary light that illuminates the outside of the illuminated area of the liquid crystal panel 18.

For this purpose, the following condition may be satisfied where f1 is a focal length of the lens cell of the first lens array 13 on the XZ section, and f2 is a focal length of the lens cell of the first lens array 13 on the YZ section:

$$1.0 < f1/f2 < 1.5. \quad \text{Expression 8}$$

When a value becomes smaller than the lower limit or larger than the upper limit of Expression 8, the secondary light source image becomes distant from the polarization converter 15 and the polarization conversion efficiency lowers. As a result, the image becomes dark, and the intended performance cannot be obtained.

f1 and f2 may further satisfy the following condition:

$$1.02 < f1/f2 < 1.25. \quad \text{Expression 9}$$

While this embodiment illustrates the elliptical reflector, a parabolic reflector and a lens having a positive optical power may be used.

Second Embodiment

Figure 7:
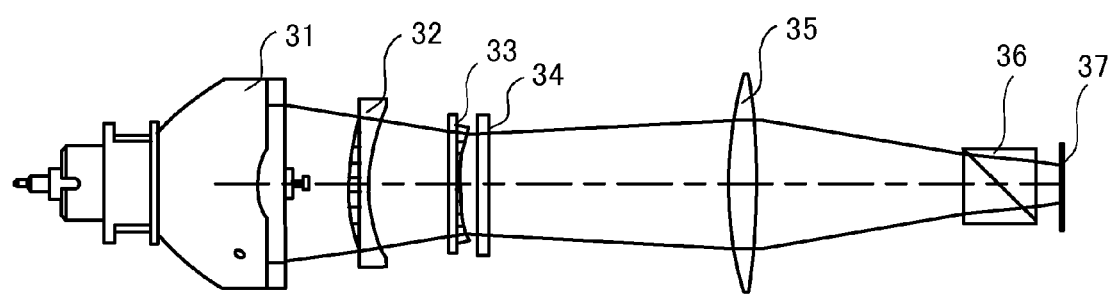
FIG. 7 is a longitudinal sectional view of the illumination optical system according to a second embodiment.
Figure 8:
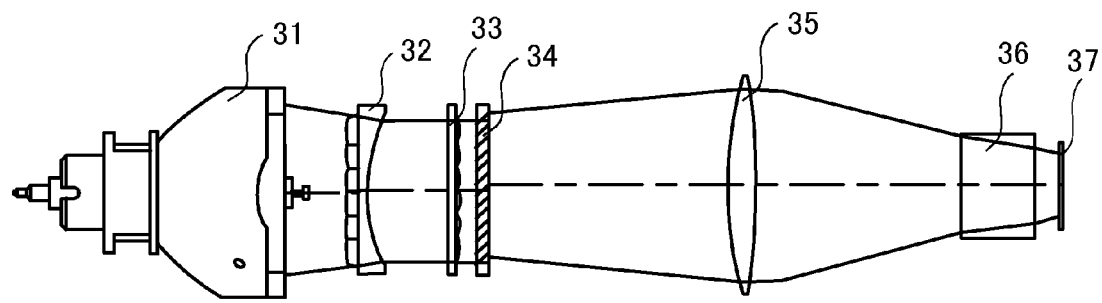
FIG. 8 is a lateral sectional view of the illumination optical system according to the second embodiment.

FIGS. 7 and 8 are optical path diagrams illustrating the structure of the illumination optical system used for the liquid crystal projector (image projection apparatus) according to the second embodiment. FIG. 7 illustrates a longitudinal section, and FIG. 8 illustrates a lateral section. Similar to the first embodiment, FIG. 7 sets the longitudinal section to the YZ surface (first section), and FIG. 8 sets the lateral section to the XZ surface (second section).

Reference numeral 31 denotes a light source unit, reference numeral 32 denotes a first fly-eye lens, reference numeral 33 denotes a second fly-eye lens, reference numeral 34 denotes a polarization converter, reference numeral 35 denotes a condenser lens, reference numeral 36 denotes a PBS, and reference numeral 37 denotes a liquid crystal panel. An R2 surface of the first fly-eye lens 32 forms a concave lens that has a negative optical power on the XZ section and the YZ section.

Convergent light flux from the light source unit 31 is split into a plurality of light fluxes by R1 of the first fly-eye lens 32. The lateral sections of the plurality of split light fluxes are collimated on the R2 surface of the first fly-eye lens 32 having the negative optical power, and the longitudinal section of the plurality of split light fluxes are collimated by the second fly-eye lens 33.

The plurality of collimated and split light fluxes form a plurality of secondary light source images near the second fly-eye lens 33 and the polarization converter 34. The light flux that forms each secondary light source image is converted into linearly polarized light that has a predetermined polarization direction by the polarization converter 34, and enters the condenser lens 35.

The plurality of split light fluxes emitted from the condenser lens 35 transmit the polarization beam splitter 36, and are superimposed on the liquid crystal panel 37. Thereby, the liquid crystal panel 37 are illuminated by the uniformly distributed illumination light fluxes.

This embodiment integrates the concave lens having a negative optical power with the R2 surface of the first fly-eye lens 32 instead of the collimator lens having the negative optical power, and reduces the structural size. In addition, this embodiment projects a bright image while preventing the image quality degradation.

While this embodiment arranges a concave lens having a negative optical power on an R2 surface of the first fly-eye lens 32, a concave lens having a negative optical power may be arranged between the first fly-eye lens 32 and the second fly-eye lens 33.

Third Embodiment

Figure 9:
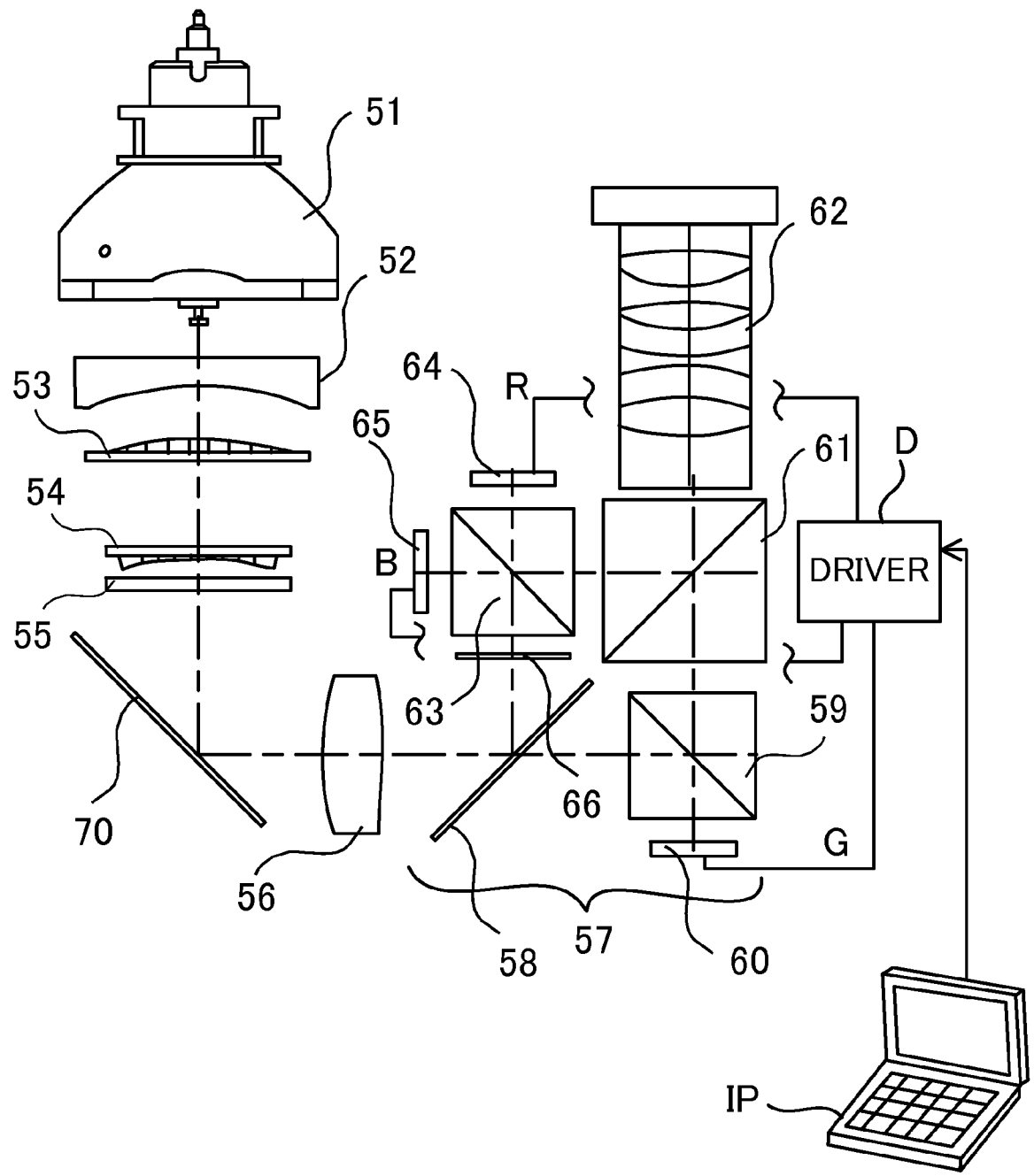
FIG. 9 is a structural diagram of an image projection apparatus that includes the illumination optical system according to a third embodiment.

FIG. 9 is an optical path diagram of an image projection apparatus having the illumination optical system according to the first embodiment.

A light flux emitted from a light source unit is converted into a parallel light flux by a collimator lens 52, and exited. This parallel light flux is split into a plurality of light fluxes by a first fly-eye lens 53 corresponding to the first fly-eye lens 13, and each split light flux is condensed.

Each split light flux is condensed near the polarization converter 55 and the second fly-eye lens 54 corresponding to the second fly-eye lens 14, and forms an image of the light source (secondary light source image). The first and second fly-eye lenses 53, 54 are formed by the plurality of lens cells that are arranged in two-dimensional directions. Each lens cell has a rectangular lens shape similar to the liquid crystal panel (image display device) as a surface to be illuminated which will be described later.

A polarization converter 55 converts each split light flux emitted from the second fly-eye lens 54 into s-polarized light as linearly polarized light. The s-polarized light emitted from the polarization converter 55 is reflected by the mirror 70. Thereafter, it is condensed by the condenser lens 56, passes a color analyzing/synthesizing optical system 57, and illuminates B-band, G-band, and R-band reflection type liquid crystal panels 65, 60, and 64 in the superimposing manner.

The color analyzing/synthesizing optical system 57 includes a dichroic mirror 58 configured to reflect the B-band light and the R-band light among the polarized light that has transmitted the condenser lens 56, and to transmit the G-band light. The G-band polarized light that has transmitted through the dichroic mirror 58 is reflected by the first PBS 59, and enters the G-band reflection type liquid crystal panel 60.

Each reflection type liquid crystal panel is connected to a driver D. The driver D, which is part of a projector (image projection apparatus) mounted with the projection optical system, is supplied with an image signal from an image information supplier IP, such as a personal computer, a DVD player, video deck, or a TV tuner. The driver D drives the reflection type liquid crystal panels corresponding to a color based on the RGB components of the input image signal. Thereby, each reflection type liquid crystal panel reflects and modulates incident light of each wavelength band, and emits image light.

The image light from the G-band liquid crystal panel (referred to as a "G liquid crystal panel" hereinafter) 60 transmits through the first PBS 59 and a synthesizing prism 61, and is projected upon the screen (not illustrated) by a projection lens 62.

Among the B-band polarized light and the R-band polarized light reflected by the dichroic mirror 58, the R-band polarized light is converted into the p-polarized light by a wavelength selective phase plate 66, and transmits through the second polarization beam splitter 63, and the B-band polarized light is reflected by the third polarization beam splitter 63. The B-band polarized light and the R-band polarized light emitted from the second polarization beam splitter 63 condense upon the B-band liquid crystal panel ("B liquid crystal panel" hereinafter) 65 and the R-band liquid crystal panel ("R liquid crystal panel" hereinafter) 64, respectively.

The R-band polarized light reflected and modulated by the R liquid crystal panel 64 is reflected by the second polarization beam splitter 63. The B-band polarized light reflected and modulated by the B liquid crystal panel 65 transmits through the second polarization beam splitter 63. These R-band polarized light and B-band polarized light are reflected by the synthesizing prism 61, and projected onto the screen by the projection lens 62.

While each embodiment utilizes a secondary fly-eye lens for the lens array configured to split an incident light flux from the light source, a lens array including linearly arranged cylindrical lenses can provide the effects of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-290485, filed Dec. 27, 2010 which is hereby incorporated by reference herein in its entirety.

What is claimed is:

1. An illumination optical system configured to illuminate an image display device using a light flux from a light source, the illumination optical system comprising:
   a polarization splitter having a first polarization splitting surface configured to split a polarization component of the light flux;
   a first compression system configured to compress the light flux on each of a first section that contains a normal of the first polarization splitting surface and an optical axis of the illumination optical system, and a second section that contains the optical axis and is orthogonal to the first section;
   a polarization converter configured to convert non-polarized light into linearly polarized light and that includes a second polarization splitting surface, and is arranged so that a section that contains a normal of the second polarization splitting surface and the optical axis becomes the second section; and
   a second compression system configured to compress the light flux in the first section and includes:
      a first lens array that includes a plurality of lens cells configured to split the light flux into a plurality of light fluxes, and is arranged on the light source side with respect to the polarization converter along the optical axis; and
      a second lens array that includes a plurality of lens cells corresponding to the plurality of lens cell of the first lens array, and is arranged between the first lens array and the polarization converter along the optical axis,
   wherein both of the first lens array and the second lens array have no optical power in the second section,
   wherein a light flux from the first compression system is incident on all of the plurality of lens cells of the first lens array in the first section and the second section, and
   wherein the following conditions are satisfied:

$1.1 < \alpha < 1.5$; and $1.1 < \beta < 1.5$, where $\alpha$ is a compression ratio applied by the second compression system in the first section and $\beta$ is a compression ratio applied by the first compression system in the first and second sections.

2. The illumination optical system according to claim 1, wherein:
   the first lens array has a positive optical power in the first section, at least part of lens cells decentering among the plurality of lens cells in the first lens array, and
   the second lens array has a negative optical power in the first section, at least part of lens cells decentering among the plurality of lens cells in the second lens array.

3. The illumination optical system according to claim 1, wherein the first compression system includes:
   a first optical element that has positive optical powers both in the first section and the second section; and
   a second optical element that has negative optical powers both in the first section and the second section.

4. The illumination optical system according to claim 3, wherein the first optical element is an elliptical reflector configured to reflect and condense the light flux from the light source.

5. The illumination optical system according to claim 3, wherein the first compression system is an afocal system.

6. The illumination optical system according to claim 3, wherein the first lens array is integrated with the second optical element.

7. The illumination optical system according to claim 1, wherein the following condition is satisfied:

$1.0 < f1/f2 < 1.5$, where f1 is a focal length of the plurality of lens cells in the first lens array in the second section, and f2 is a focal length of the plurality of lens cells in the first lens array in the first section.

8. The illumination optical system according to claim 1, wherein the first compression system is arranged on the light source side with respect to the second compression along the optical axis.

9. An image projection apparatus comprising:
   an image display device; and
   an illumination optical system configured to illuminate the image display device using light flux from a light source,
   wherein the illumination optical system includes:
   a polarization splitter having a first polarization splitting surface configured to split a polarization component of the light flux;
   a first compression system configured to compress the light flux on each of a first section that contains a normal of the first polarization splitting surface and an optical axis of the illumination optical system, and a second section that contains the optical axis and is orthogonal to the first section;
   a polarization converter configured to convert non-polarized light into linearly polarized light and that includes a second polarization splitting surface, and is arranged so that a section that contains a normal of the second polarization splitting surface and the optical axis becomes the second section; and
   a second compression system configured to compress the light flux in the first section and includes:
      a first lens array that includes a plurality of lens cells configured to split the light flux into a plurality of light fluxes, and is arranged on the light source side with respect to the polarization converter along the optical axis; and
      a second lens array that includes a plurality of lens cells corresponding to the plurality of lens cell of the first lens array, and is arranged between the first lens array and the polarization converter along the optical axis, wherein both of the first lens array and the second lens array have no optical power in the second section, wherein a light flux from the first compression system is incident on all of the plurality of lens cells of the first lens array in the first section and the second section, and wherein the following conditions are satisfied:

$$1.1 < \alpha < 1.5; \text{ and}$$

$$1.1 < \beta < 1.5,$$

where $\alpha$ is a compression ratio applied by the second compression system in the first section and $\beta$ is a compression ratio applied by the first compression system in the first and second sections.

10. An illumination optical system configured to illuminate an image display device using a light flux from a light source, the illumination optical system comprising:

a polarization splitter having a first polarization splitting surface configured to split a polarization component of the light flux;

a first compression system configured to compress the light flux on each of a first section that contains a normal of the first polarization splitting surface and an optical axis of the illumination optical system, and a second section that contains the optical axis and is orthogonal to the first section;

a polarization converter configured to convert non-polarized light into linearly polarized light and that includes a second polarization splitting surface, and is arranged so that a section that contains a normal of the second polarization splitting surface and the optical axis becomes the second section; and a second compression system configured to compress the light flux in the first section and includes:

a first lens array that includes a plurality of lens cells configured to split the light flux into a plurality of light fluxes, and is arranged on the light source side with respect to the polarization converter along the optical axis; and a second lens array that includes a plurality of lens cells corresponding to the plurality of lens cell of the first lens array, and is arranged between the first lens array and the polarization converter along the optical axis, wherein an angular distribution of the light flux incident upon an entry surface of the image display device in the first section is smaller than an angular distribution in the second section, wherein a light flux from the first compression system is incident on all of the plurality of lens cells of the first lens array in the first section and the second section, and wherein the following conditions are satisfied:

$$1.1 < \alpha < 1.9; \text{ and}$$

$$1.1 < \beta < 1.9,$$

where $\alpha$ is a compression ratio applied by the second compression system in the first section and $\beta$ is a compression ratio applied by the first compression system in the first and second sections.

11. An image projection apparatus comprising:
an image display device; and
an illumination optical system configured to illuminate the image display device using a light flux from a light source, wherein the illumination optical system includes:

a polarization splitter having a first polarization splitting surface configured to split a polarization component of the light flux;

a first compression system configured to compress the light flux on each of a first section that contains a normal of the first polarization splitting surface and an optical axis of the illumination optical system, and a second section that contains the optical axis and is orthogonal to the first section;

a polarization converter configured to convert non-polarized light into linearly polarized light and that includes a second polarization splitting surface, and is arranged so that a section that contains a normal of the second polarization splitting surface and the optical axis becomes the second section; and a second compression system configured to compress the light flux in the first section and includes:

a first lens array that includes a plurality of lens cells configured to split the light flux into a plurality of light fluxes, and is arranged on the light source side with respect to the polarization converter along the optical axis; and a second lens array that includes a plurality of lens cells corresponding to the plurality of lens cell of the first lens array, and is arranged between the first lens array and the polarization converter along the optical axis, wherein an angular distribution of the light flux incident upon an entry surface of the image display device in the first section is smaller than an angular distribution in the second section, wherein a light flux from the first compression system is incident on all of the plurality of lens cells of the first lens array in the first section and the second section, and wherein the following conditions are satisfied:

$$1.1 < \alpha < 1.9; \text{ and}$$

$$1.1 < \beta < 1.9,$$

where $\alpha$ is a compression ratio applied by the second compression system in the first section and $\beta$ is a compression ratio applied by the first compression system in the first and second sections.

* * * * *